(12) United States Patent
Bauman et al.

(10) Patent No.: US 10,518,520 B2
(45) Date of Patent: Dec. 31, 2019

(54) APPARATUS AND METHOD FOR TILED DISPLAY REMOVAL

(71) Applicant: CHRISTIE DIGITAL SYSTEMS USA, INC., Cypress, CA (US)

(72) Inventors: Alexander Kyle Bauman, Heidelburg (CA); Daniel Robert Adema, Kitchener (CA); Bryan Russell Hemphill, Waterloo (CA); Alyssa Bruulsema, Ancaster (CA)

(73) Assignee: CHRISTIE DIGITAL SYSTEMS USA, INC. CA (US)

( * ) Notice: Subject to any disclaimer, the term of this patent is extended or adjusted under 35 U.S.C. 154(b) by 143 days.

(21) Appl. No.: 15/695,125

(22) Filed: Sep. 5, 2017

(65) Prior Publication Data

US 2019/0070843 A1     Mar. 7, 2019

(51) Int. Cl.
| | |
|---|---|
| *B32B 38/10* | (2006.01) |
| *G09F 9/302* | (2006.01) |
| *B32B 43/00* | (2006.01) |
| *G06F 3/14* | (2006.01) |

(52) U.S. Cl.
CPC ............ *B32B 38/10* (2013.01); *B32B 43/006* (2013.01); *G06F 3/1446* (2013.01); *G09F 9/3026* (2013.01); *B32B 2457/20* (2013.01)

(58) Field of Classification Search
CPC ...................................................... B32B 38/10
See application file for complete search history.

(56) References Cited

U.S. PATENT DOCUMENTS

| | | | |
|---|---|---|---|
| 6,503,356 | B1 | 1/2003 | Sakai et al. |
| 6,683,665 | B1 | 1/2004 | Matthies |
| 7,524,390 | B2 | 4/2009 | DeMeter et al. |
| 8,555,749 | B2 | 10/2013 | Gatski |
| 8,739,851 | B2 | 6/2014 | Fessler-Knobel et al. |
| 8,900,394 | B2 | 12/2014 | Raffles et al. |
| 9,102,025 | B2 | 8/2015 | Raffles et al. |
| 9,272,379 | B2 | 3/2016 | Fessler-Knobel et al. |
| 2016/0348854 | A1 * | 12/2016 | Wu .......................... G09F 13/00 |

FOREIGN PATENT DOCUMENTS

| | | | |
|---|---|---|---|
| CN | 203733418 U | 7/2014 | |
| WO | WO-2015189558 A1 * | 12/2015 | ............... B32B 7/04 |

OTHER PUBLICATIONS

EPO, Extended European Search Report, dated Jan. 29, 2019, re European Patent Application No. 18192306.1.

* cited by examiner

*Primary Examiner* — Daniel H Lee
(74) *Attorney, Agent, or Firm* — Perry + Currier Inc.

(57) ABSTRACT

An apparatus for removing a display from a tiled display arrangement is provided. The apparatus includes a body, a handle coupled to a first side of the body, and an interface material coupled to the second side of the body. The interface material is configured to temporarily bond to a front surface of the display for removing the display from the tiled display arrangement. The interface material is further configured to selectively de-bond from the front surface of the display. In some implementations, the interface material may be selected to result in a bond with high tensile strength and shear strength, as well as low peel strength.

10 Claims, 14 Drawing Sheets

APPARATUS AND METHOD FOR TILED DISPLAY REMOVAL

FIELD

The present invention relates generally to tiled display arrangements, and more particularly to an apparatus and method for removing a display from a tiled display arrangement.

BACKGROUND

Tiled display arrangements are amalgamations of individual displays or display units set in an array to create a larger display area. Sometimes, an individual display must be removed for repair or replacement. Current products or solutions to solve the issue of handling a display in a tiled display arrangement include suction cups, magnetic tools, or prying tools.

Suction cups generally require a surface which is smooth and continuous to provide an air-tight seal. With direct view LEDs (light emitting diodes), this is not a viable solution due to the nature of the LED packages having a distance between edges of the LED packages.

Magnetic tools or apparatuses currently exist in some products. These tools can require a significant amount of magnetic force to overcome the mounting apparatus used to retain the display. In many cases, the implementation of magnets as a removal tool is expensive due to the number of magnets, and an apparatus may be required to activate/engage and/or deactivate/disengage the force of the magnets. The size and configuration of the magnets impacts the weight of the apparatus.

Physical tools used to pry, pull, or dislodge the display from its mounting have a high risk to cause damage to display units. Further, for small-bezel or bezel-less display units, there is no effective space at the edges for an apparatus to physically engage the sides or edges of the display to remove or install it.

SUMMARY

An apparatus for removing a display from a tiled display arrangement is provided. The apparatus includes a body, a handle and an interface material. In some embodiments, the interface material provides a high tensile strength and high shear strength bond to allow the display to be securely removed from the mounting mechanism of the tiled display arrangement. The interface material provides a low peel strength bond to allow the apparatus to be easily and selectively de-bonded from the front surface of the display. Preferably, the interface material is a material such as a dry adhesive or a micro- or nano-suction material which leaves no residue.

In some embodiments, the thickness interface material may be varied to achieve a specific strength of adhesion and difficulty of peel. In some embodiments, the thickness of the body may be varied to complement the thickness of the interface material.

In other embodiments, the geometry of the interface material may be configured achieve a specific optimal peel path. In some embodiments, the geometry of the body may be configured to encourage specific types of peels, such as a roll peel, a pivot peel, or a multi-pad peel.

In some embodiments, the thickness and geometry of the interface material and the body may be varied and/or selected in conjunction to further tune the properties for adhesion and peel and to achieve a specific desired performance.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

According to an aspect of the present invention, an apparatus for removing a display in a tiled display arrangement is provided. The apparatus includes a body having a first side and a second side opposing the first side; a handle coupled to the first side of the body; and an interface material coupled to the second side of the body, the interface material configured to temporarily bond to a front surface of the display for removing the display from the tiled display arrangement and configured to selectively de-bond from the front surface of the display.

In some implementations, the interface material comprises an adhesive. In some implementations, the adhesive comprises a dry adhesive. In some implementations, the interface material comprises a micro- or nano-suction material. In some implementations, the interface material provides a high shear strength and high tensile strength bond for temporarily bonding to the front surface of the display and removing the display from the tiled display arrangement and low peel strength for selectively de-bonding from the front surface of the display.

In some implementations, the apparatus further comprises a spring-loaded plunger to initiate a peel for selectively de-bonding from the front surface of the display. In some implementations, the apparatus further comprises a lever to initiate a peel for selectively de-bonding from the front surface of the display.

In some implementations, the interface material has a varying thickness. In some implementations, the body has a varying thickness. In some implementations, the interface material is multifaceted for adhering to uneven surfaces. In some implementations, the apparatus further comprises legs extending from the second side of the body and wherein the interface material is coupled to the legs.

According to another aspect of the present invention, a method of removing a display in a tiled display arrangement is provided. The method comprises bonding an apparatus to a front surface of the display using an interface material of the apparatus; removing the display from the tiled display arrangement using the apparatus; and de-bonding the apparatus from the front surface of the display.

In some implementations, the de-bonding comprises peeling the interface material from the front surface of the display. In some implementations, the peeling is one of: a pivot peel, a roll peel, a path peel, or a multi-pad peel. In some implementations, the de-bonding further comprises depressing a plunger to initiate the peeling of the interface material from the front surface of the display.

DETAILED DESCRIPTION

Figure 1A:
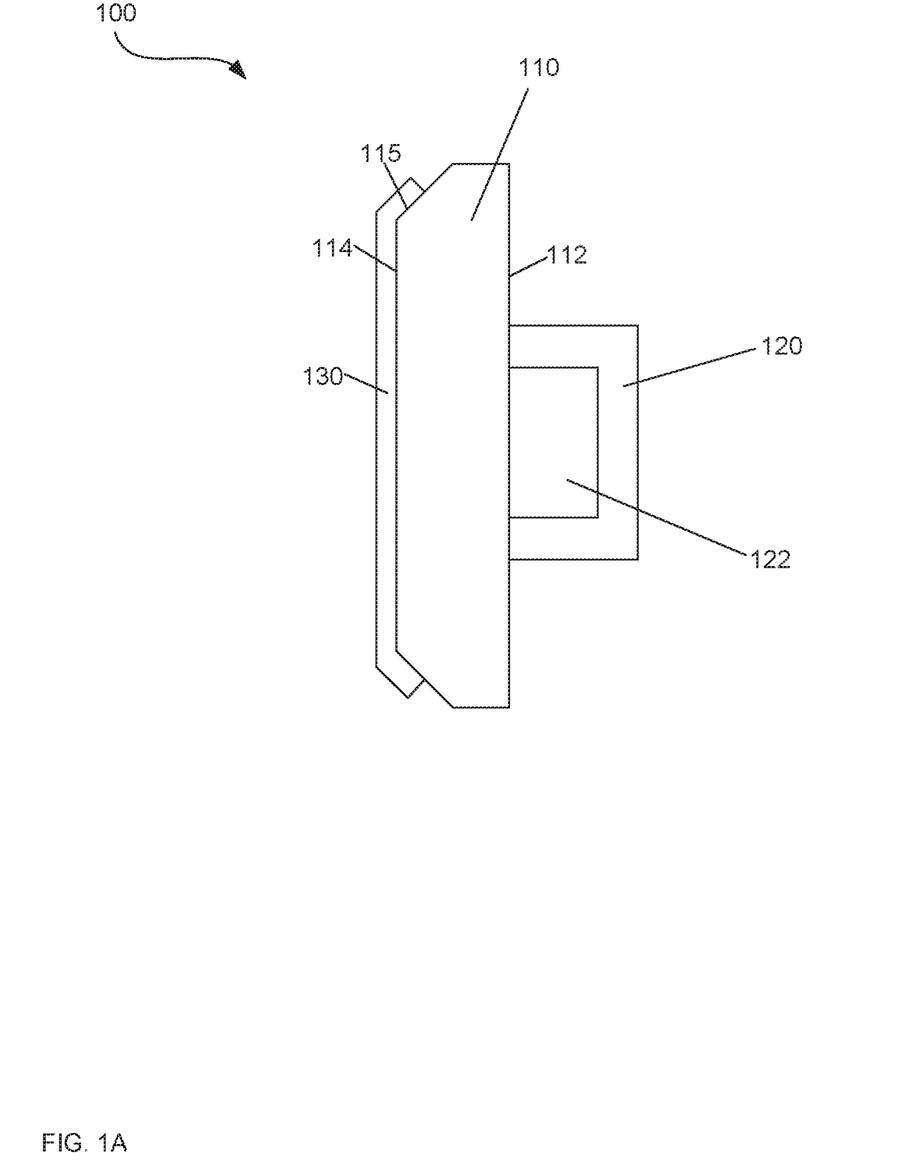
FIG. 1A depicts a side view of an apparatus for removing a display from a tiled display arrangement, according to an embodiment of the invention.
Figure 1B:
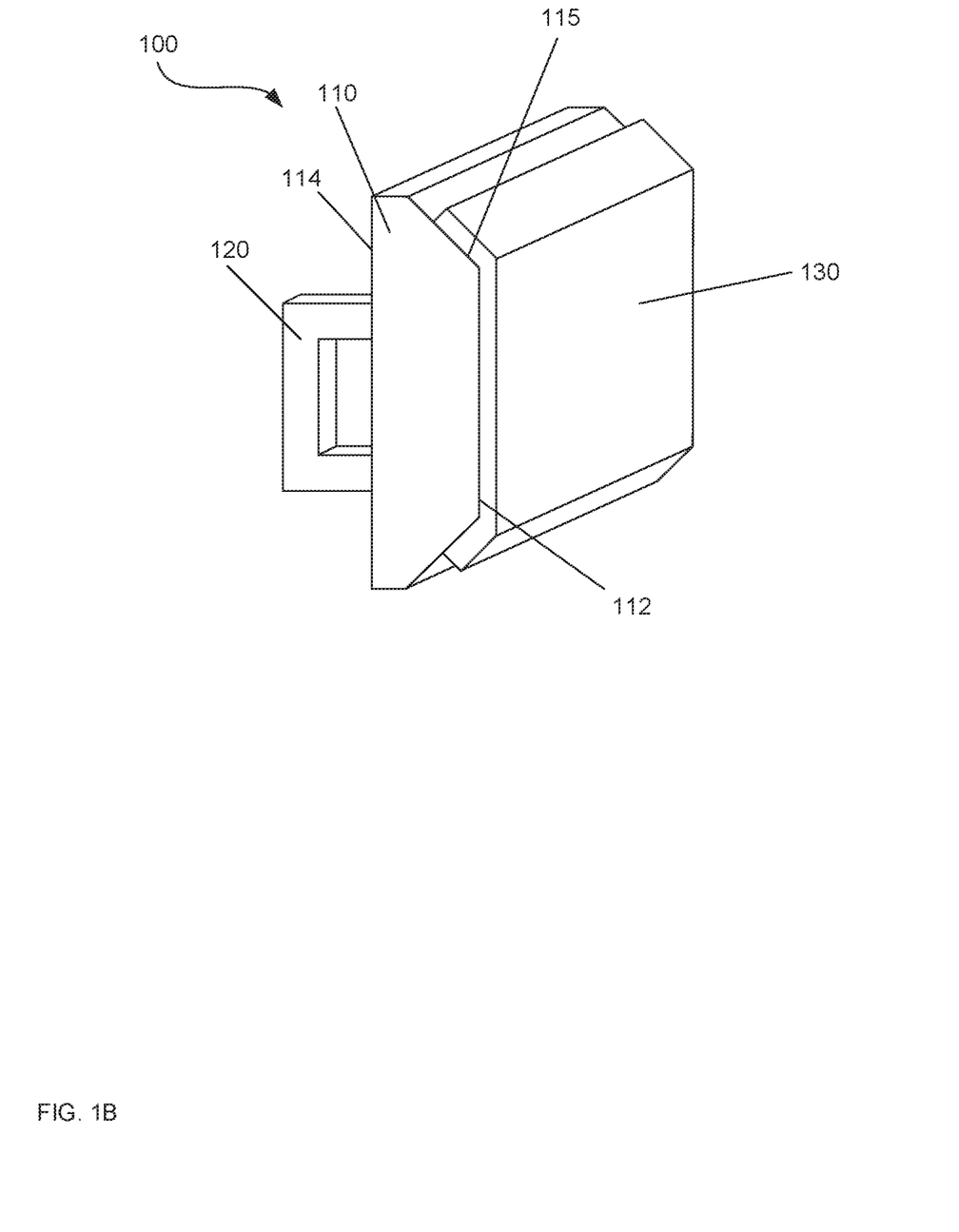
FIG. 1B depicts a perspective view of the apparatus of FIG. 1A.

FIG. 1A depicts an apparatus 100 for removing a display from a tiled display arrangement, according to an embodiment of the present invention. The apparatus 100 includes a body 110, a handle 120, and an interface material 130. FIG. 1B depicts a perspective view of the apparatus 100.

The body 110 has a first side 112 and a second side 114, the second side 114 opposing the first side 112. The body 110 can comprise any suitable material for providing structural support to the apparatus 100. The body 110 can include, but is not limited to, combinations of metals, plastics and the like. Preferably the body 110 is made lightweight for allowing the apparatus 100 to be easily handled. As depicted, the body 110 may have one or more pivot edges 115 adjacent the second side 114 about which the apparatus 100 may pivot, as described below with reference to FIG. 10 and FIG. 11.

The handle 120 is coupled to the first side 112 of the body 110. The handle 120 can comprise any suitable material for allowing a user to maneuver the apparatus 100 via the handle 120. The handle 120 can include, but is not limited to, combinations of metals, plastics and the like. The handle 120 may be integral with the body 110, or may be coupled to the body 110 by welds, screws, bolts, or other suitable fasteners. The handle 120 may be coupled to the body 110 at two points to define an aperture 122 for receiving a hand or a part of a hand of a user. Alternately, handle the 120 may be knob-shaped or it may be contoured to fit the hand of a user, or otherwise suitable for maneuvering the apparatus 100.

The interface material 130 is coupled to the second side 114 of the body 110. The interface material 130 may be coupled to the second side 114 by an adhesive, such as a film adhesive or a wet adhesive. The interface material 130 is configured to temporarily bond to a front surface of the display for removing the display from the tiled display arrangement. The interface material 130 is also configured to selectively de-bond from the front surface of the display. For example, interface material 130 may be an adhesive or a micro- or nano-suction material. In some implementations, the interface material 130 comprises a dry adhesive so as to not leave residue on the display when the apparatus 100 is de-bonded from the display.

The interface material 130 has adhesion properties chosen to achieve the desired tensile strength, shear strength, and peel strength of the temporary bond to the front surface of the display. The interface material 130 may form a bond with another surface. Generally, the bond will form in a plane, known as the bond plane. Tensile strength of the bond may be understood as an indication of the interface material 130 to remain bonded to the other surface under tensile stress. Tensile stress is stress exerted on the bond between the interface material 130 and the other surface in a direction perpendicular to the bond plane. Shear strength of the bond may be understood as an indication of the interface material 130 to remain bonded to the other surface under shear stress. Shear stress is stress exerted on the bond between the interface material 130 and the other surface in a direction parallel to the bond plane. Together, tensile strength and shear strength may provide a holding strength to retain a bond between the interface material 130 and another surface. Peel strength of the bond may be understood as an indication of the interface material 130 to remain bonded to the other surface under peel stress. Peel stress is stress exerted along a peel line at the edge of the bond.

Figure 8:
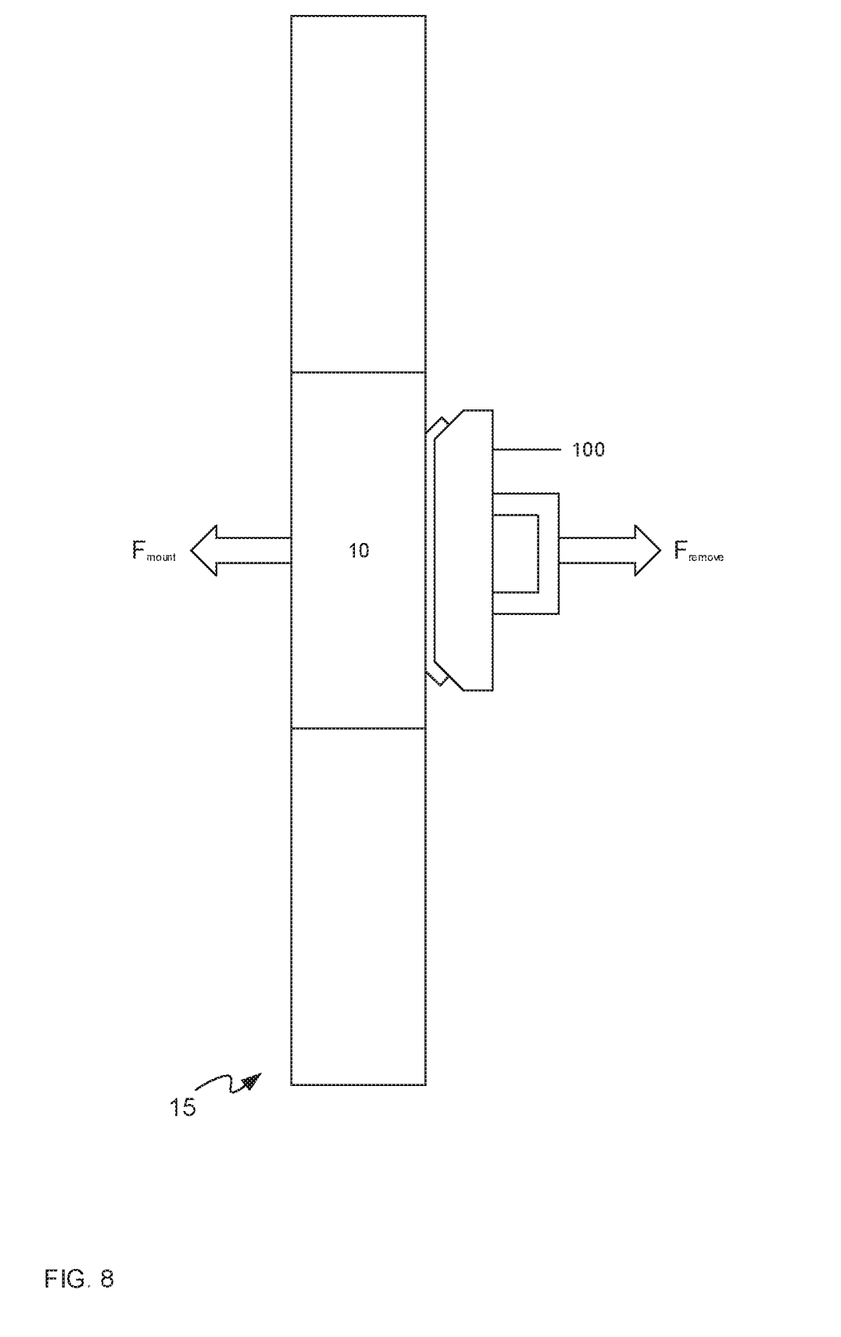
FIG. 8 depicts the apparatus of FIG. 1A bonded to a display in a tiled display arrangement.

FIG. 8 depicts the apparatus 100 bonded to the front surface of a display 10 in a tiled display arrangement 15. Possible sizes for display 10 include, but are not limited to, 240 mm by 270 mm, 480 mm by 270 mm, 500 mm by 500 mm and 1280 mm by 800 mm. The display 10 is secured to a mounting apparatus (not depicted) for the tiled display arrangement 15 by a force $F_{mount}$. To remove the display 10, a user exerts a force $F_{remove}$ on the apparatus 100, for example in a direction opposite the force $F_{mount}$. The force $F_{remove}$ exerts tensile stress on the bond between the interface material 130 and the front surface of the display 10, which translates to the display 10 as the apparatus 100 is bonded to the front surface of a display 10. Hence, the force $F_{remove}$ is greater than the force $F_{mount}$. Thus, the bond generally has sufficient tensile strength to both remain bonded to the display 10 when the force $F_{remove}$ is applied to the apparatus 100 and to overcome at least the force $F_{mount}$. Put another way, the tensile strength of the bond is greater than at least the force $F_{mount}$.

Figure 9:
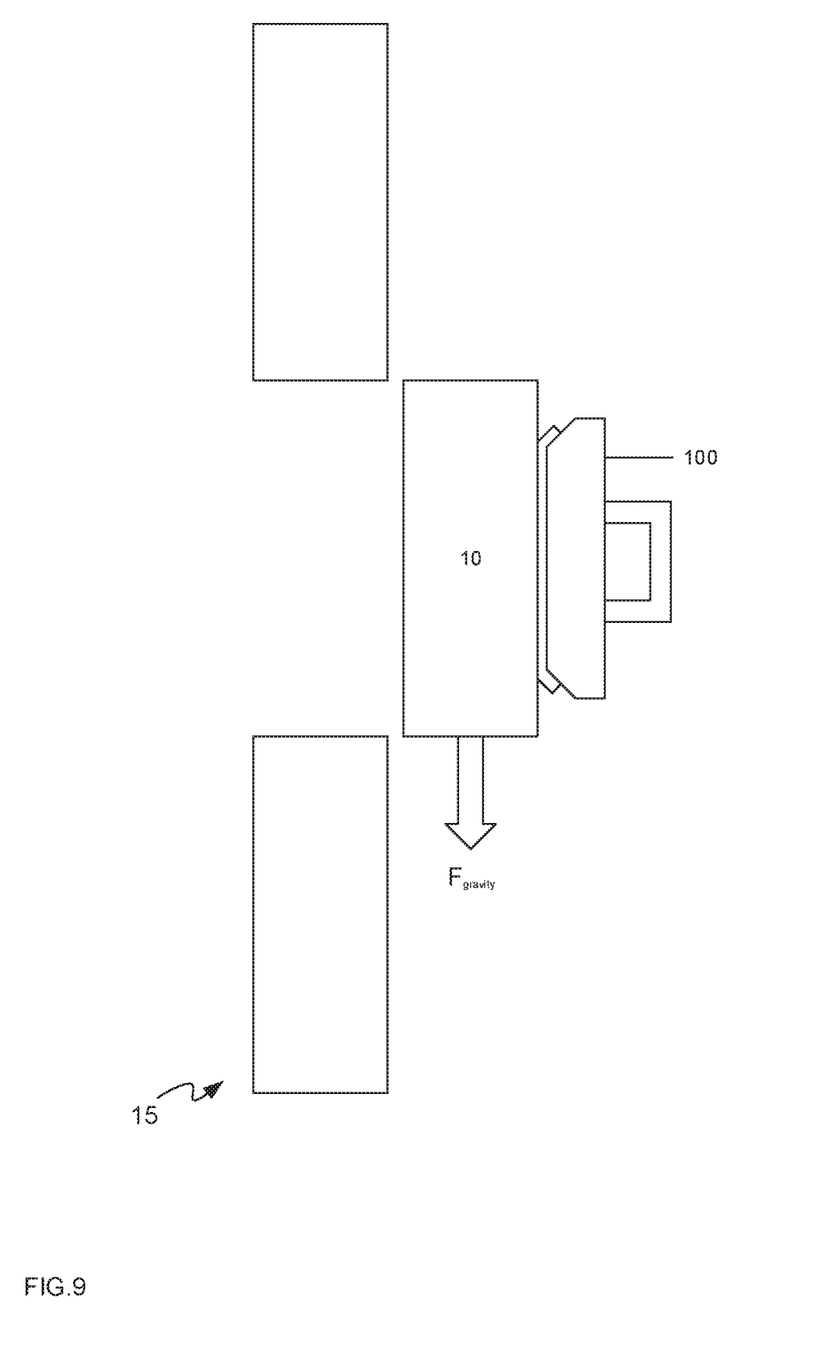
FIG. 9 depicts the apparatus of FIG. 8 removing the display from the tiled display arrangement.

FIG. 9 depicts the apparatus 100 removing the display 10 from the tiled display arrangement 15. When the display 10 has been removed from the tiled display arrangement 15, a gravitational force $F_{gravity}$ may be exerted on the display 10 as the display 10 is maneuvered using the apparatus 100. The force $F_{gravity}$ exerts shear stress on the bond between the interface material 130 and the front surface of the display 10. Hence the bond generally has sufficient shear bonding strength to remain bonded to the display 10 and to overcome at least $F_{gravity}$. Hence, for example, the shear bonding strength of the bond to the front surface of the display is greater than the gravitational force $F_{gravity}$ of the display 10.

For example, an interface material 130 can be selected for use with the apparatus 100 that results in a bond that has a tensile strength of about 1000 Pa to 6000 Pa and a shear strength of about 1200 Pa to about 6000 Pa; such a tensile strength and shear strength will, in some implementations, provide sufficient holding force for the apparatus 100 as the display 10 is removed from a tiled display arrangement 15, and as the display 10 is further maneuvered away from the tiled display arrangement 15. Depending on the mounting apparatus of the tiled display arrangement 15, and the weight of an individual display, an interface material that results in a bond to the front surface of the display with higher tensile strength and shear strength than the above-mentioned values may be selected. The holding force of the apparatus 100 may be further optimized for a display of a given size and type by tuning the surface area and adhesion properties of the interface material 130.

To de-bond the apparatus 100 from the display 10, a peeling force is applied to the apparatus 100 to initiate a peel of the apparatus 100 from the display 10. The peeling force may be applied by a peeling mechanism, which may be, for example, a geometrical or mechanical aspect of the body 110, as described further below. The peeling force exerts a peel stress on the bond to the front surface of the display. The bond to the front surface of the display generally has a peel strength of about 5-10% of the shear strength of the bond to the front surface of the display to enable the apparatus 100 to be de-bonded from the display 10 with less force than is required to remove the display 10 from the tiled display arrangement 15.

The de-bonding and/or peeling of the interface material 130 from the front surface of the display 10 may further be tuned geometrically in the configuration of the body 110 and/or the thickness of the interface material 130. By varying the thickness or other geometry of the interface material 130 and/or the geometry of the body 110, specific performance adhesion and/or peeling properties may be achieved. For example, if an interface material 130 with a varied thickness is used in conjunction with the body 110, performance can be further tuned for desired effects. As described hereafter, the body 110 may be configured to provide a specific peel path, and/or to increase surface area of adhesion, as well as varying the adhesion by height of the interface material 130 on the body 110.

Figure 10:
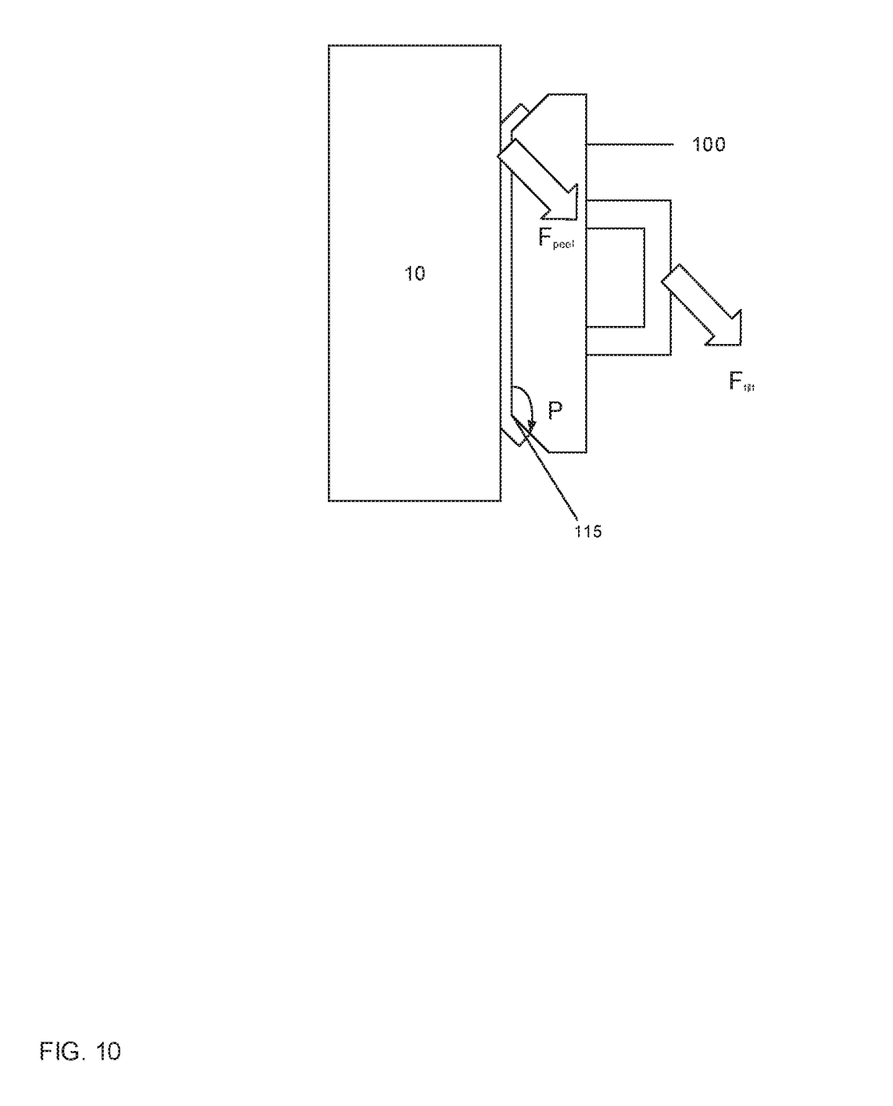
FIG. 10 depicts the apparatus of FIG. 1A being de-bonded from a display.
Figure 11:
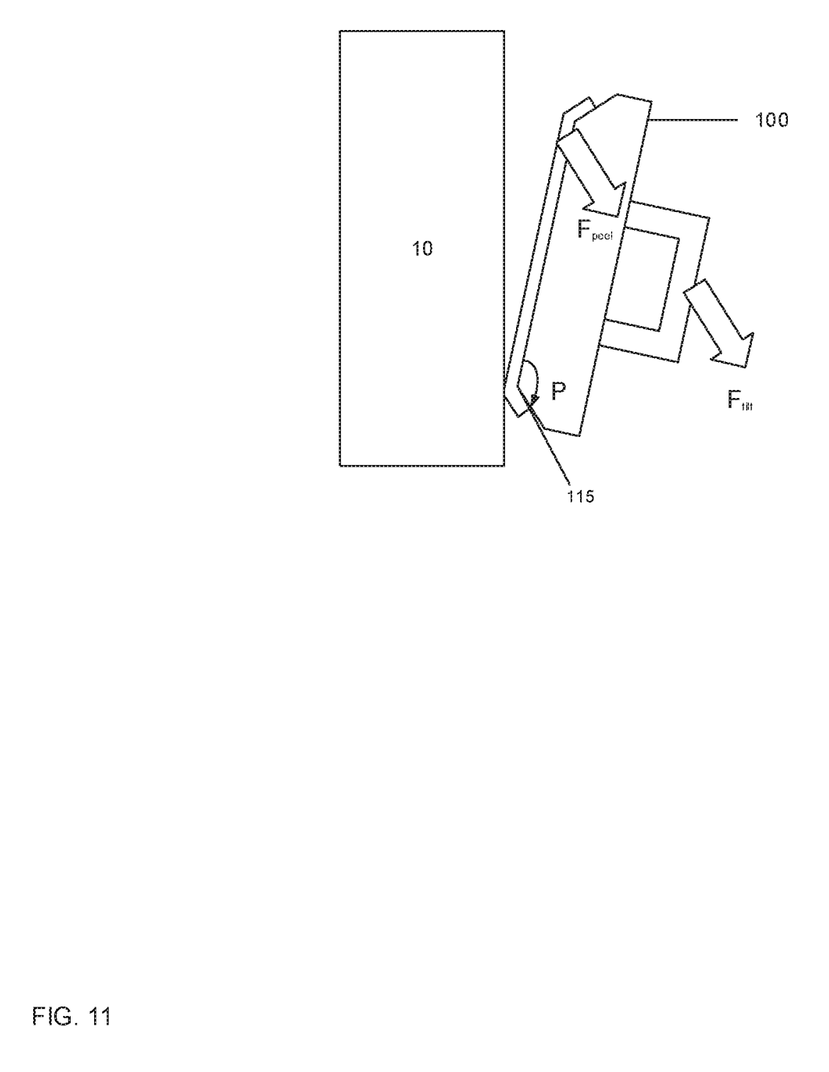
FIG. 11 depicts the apparatus of FIG. 10 being further de-bonded from the display.

FIGS. 10 and 11 shows schematically how the apparatus 100 may be de-bonded from the display 10 using a pivot peel. A pivot peel is a manner of peeling the interface material 130 from the display 10 using a pivoting motion. Hence, as depicted in FIGS. 10 and 11, a tilt force $F_{tilt}$ is applied to the handle 120 of the apparatus 100 which initiates peeling the interface material 130 from the front surface of the display using a pivoting motion P. Specifically, such a pivoting motion P about the pivot edge 115 provides a peeling force $F_{peel}$ at the opposite edge of the second side 114 to begin peeling the interface material 130 from the display 10.

Figure 2:
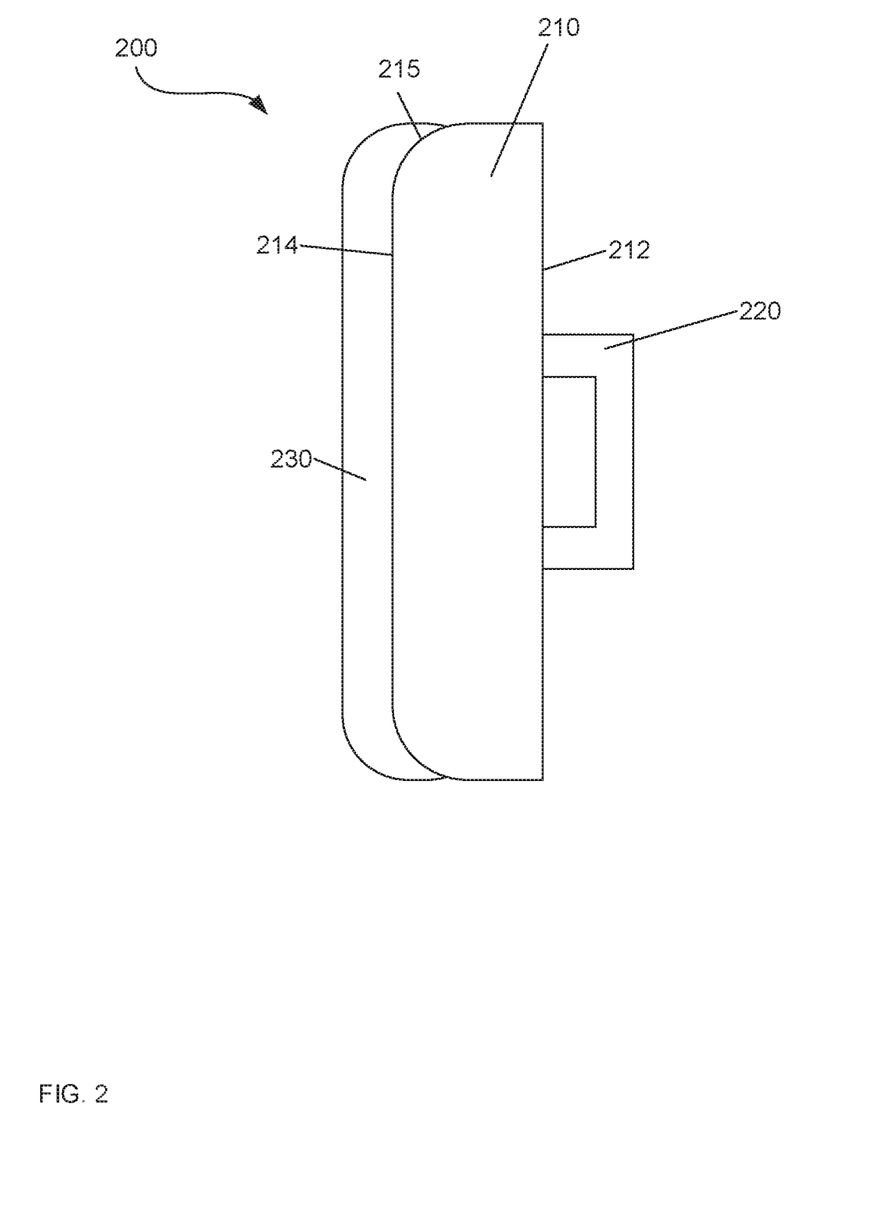
FIG. 2 depicts a side view of an apparatus for removing a display from a tiled display arrangement, according to another embodiment of the invention.

Attention is next directed to FIG. 2 which depicts another embodiment of an apparatus 200 for removing a display, such as the display 10, from a tiled display arrangement. The apparatus 200 has a body 210 having a first side 212 and a second side 214; a handle 220 coupled to the first side 212 of the body 210; and an interface material 230 (similar to the interface material 130) coupled to the second side 214 of the body 210. However, in contrast to the body 110, the body 210 includes one or more rounded edges 215 adjacent the second side 214 about which the apparatus 200 may roll. Hence, applying a tilt force on the handle 220 of the apparatus 200 can initiate peeling the interface material 230 from the front surface of the display using a rolling motion. Specifically, such a rolling motion about the rounded edge 215 provides a peeling force at the opposite edge of the second side 214 to begin peeling the interface material 230 from a display, such as the display 10. Thus the apparatus 200 may be de-bonded from the display using a roll peel, wherein the interface material 230 is peeled from the display 10 using a rolling motion.

Figure 3A:
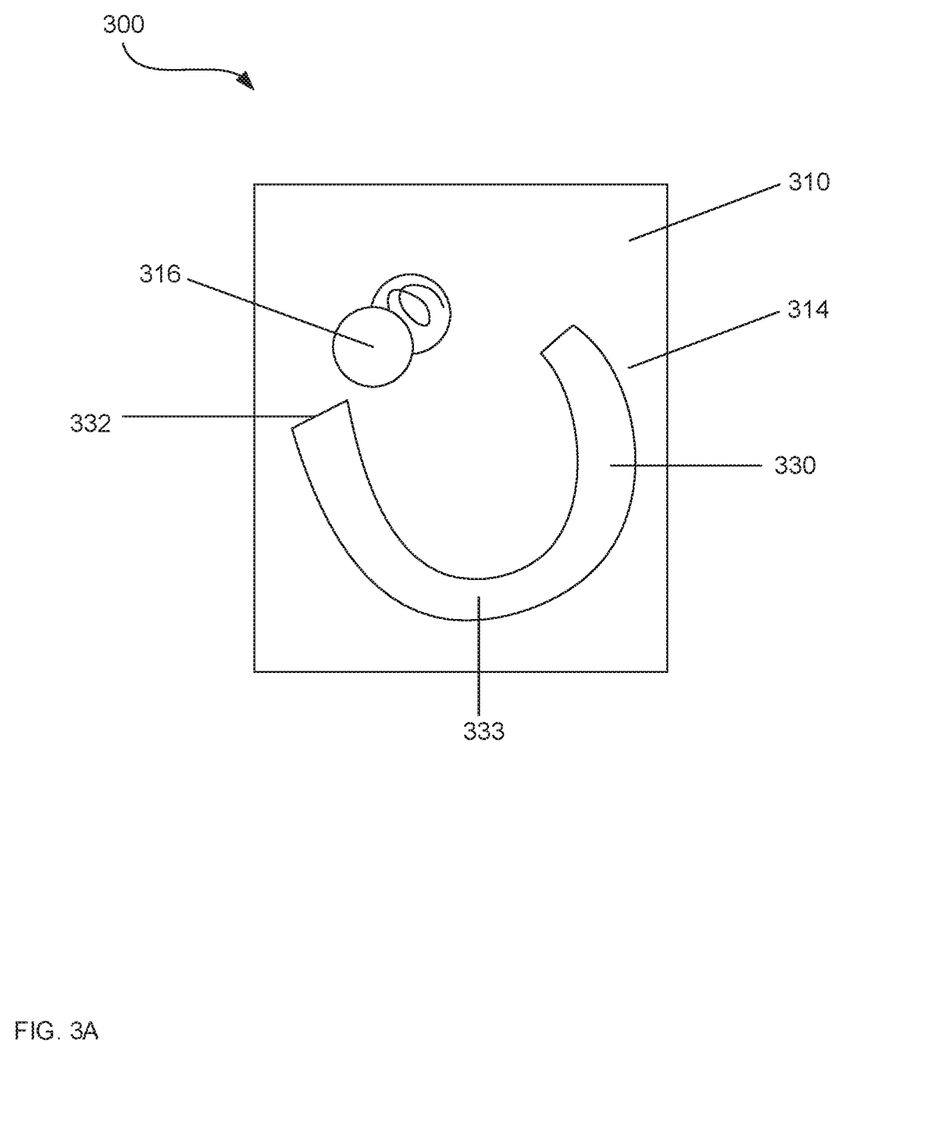
FIG. 3A depicts a front view of an apparatus for removing a display from a tiled display arrangement, according to a further embodiment of the invention.

FIG. 3A depicts another embodiment of an apparatus 300 for removing a display, such as the display 10, from a tiled display arrangement. The apparatus 300 has a body 310 having a first side (not shown) and a second side 314; a handle (not shown) coupled to the first side of body 310; and an interface material 330 (similar to the interface material 130) in a U-shape, the interface material 330 coupled to the second side 314 of the body 310. The apparatus 300 is depicted showing a front view of the second side 314; the first side and the handle of the apparatus 300 being similar to those described above.

The apparatus 300 may be de-bonded from the display 10 using a path peel. A path peel is a manner of peeling the interface material 330 from the display 10 along a path of the interface material 330, for example as defined by a shape of the interface material 330. For example, a peel path may be encouraged by having a shorter peel line at one part of the shape of the interface material 330, and a longer peel line at another part. The shorter peel line may require less peel force to peel the interface material 330 from the front surface of the display 10 than the peel force required at the longer peel line, hence the peel path initiated at the shorter peel line is easier to implement than a peel path initiated at the longer peel line. In this embodiment, the interface material 330 is configured with a U-shaped geometry to encourage a peeling motion along a specific peel path. Specifically, the desired peel path begins at the tips 332 of the U-shaped interface material 330 and continues along the U-shape. Due to the geometry of the U-shape, initiating a peel at the bottom 333 of the U-shaped interface material 330 creates a longer peel line and can be more difficult than initiating a peel at the tips 332, which have a shorter peel line. Hence a peel force may be applied in a manner that initiates peeling at the tips 332 (e.g. as opposed to applying a peel force in a manner that initiates peeling at the bottom 333 of the U-shaped interface material 330). Based on the display 10 being removed by the apparatus 300, tiled display arrangement and a display mounting apparatus of the tiled display arrangement, the geometry of the interface material 330 may be configured to minimize accidental peeling during use of the apparatus 300. For example, the interface material 330 may be S-shaped, spiral-shaped, or other suitable geometries configured to have shorter and longer peel lines, and thus encourage a peel path in specific directions while discouraging a peel path in other directions.

In some embodiments, a mechanical device may assist in initiating a peel. For example, FIG. 3A further depicts a spring-loaded plunger 316 in a depressed position to initiate a peeling motion for selectively de-bonding the apparatus 300 from the front surface of the display 10. When the spring-loaded plunger 316 is depressed, it pushes down on the front surface of the display 10 to separate the interface material 330 locally from the front surface of the display 10 and initiate the peel. The spring-loaded plunger 316 may be located near the tips 332 of the interface material 330 to encourage the peel path beginning at the tips 332. In other implementations, the spring-loaded plunger 316 may be located near the desired starting peel line for the interface material 330, such as near an edge or a corner. The apparatus 300 may include other suitable mechanical devices configured to lift a part of the body 310 away from the display 10, such as a lever, and the like, to initiate a peel for selectively de-bonding from the front surface of the display 10. The mechanical device may be used alone to initiate the peel, or it may be used in conjunction with geometrical or other means of initiating the peel, such as those described herein.

Figure 3B:
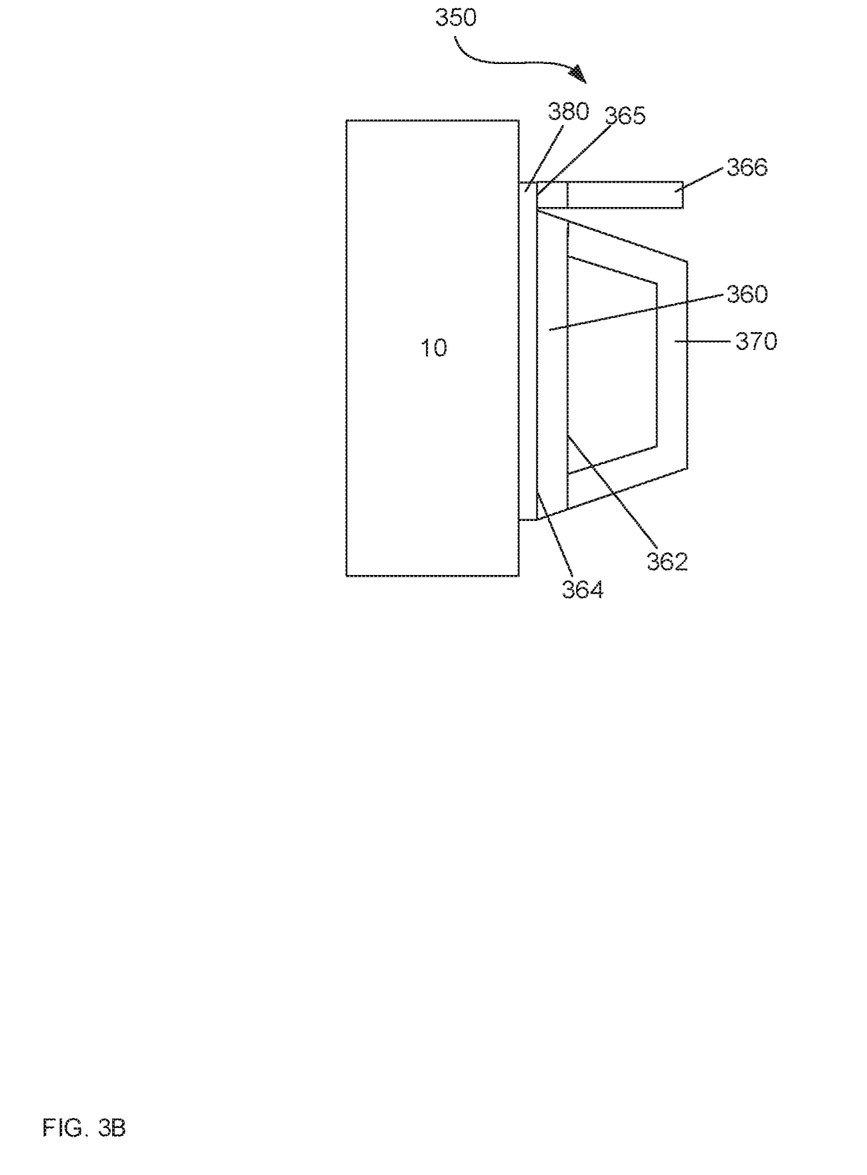
FIG. 3B depicts a side view of an apparatus for removing a display from a tiled display arrangement, according to a further embodiment of the invention.
Figure 3C:
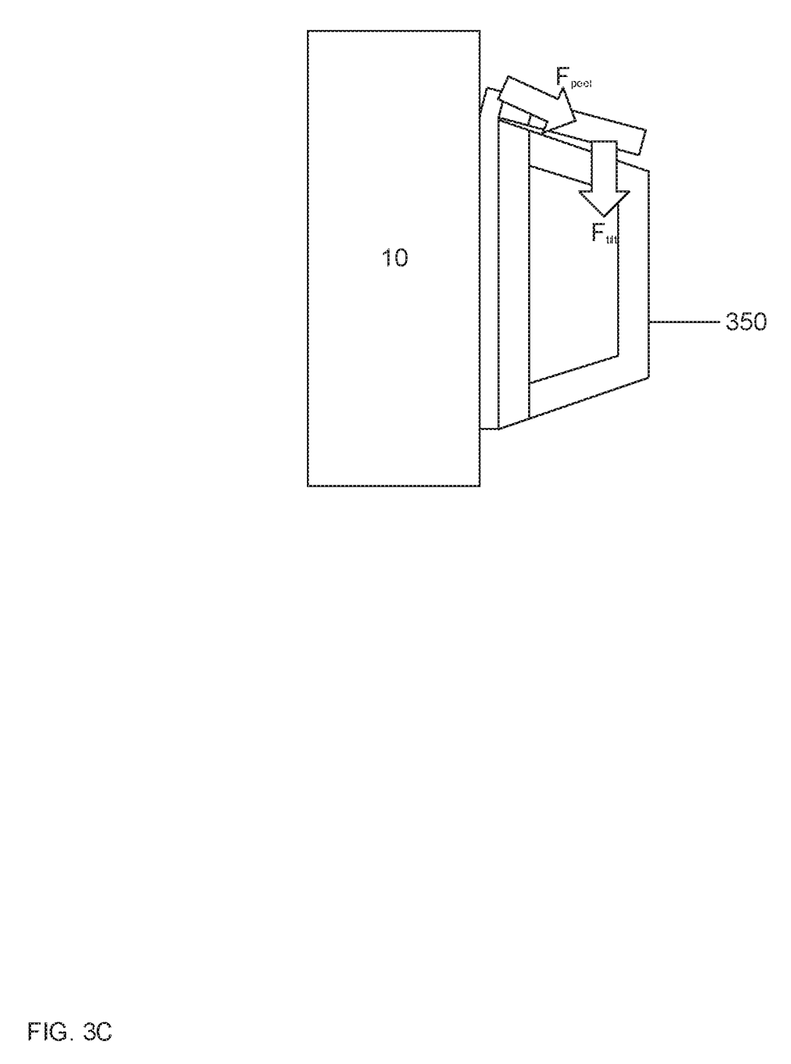
FIG. 3C depicts a side view of the apparatus of FIG. 3B with a lever in a peeling position.

FIG. 3B depicts an apparatus 350 for removing a display, such as display 10, from a tiled display arrangement. The apparatus 350 has a body 360 having a first side 362 and a second side 364; a handle 370 coupled to the first side 362 of the body 360; a lever 366 adjacent the body 360 configured to form an extension 365 of the second side 364; and an interface material 380 (similar to the interface material 130) coupled to the second side 364 of the body 360 and coupled to the lever 366 at the extension 365 of the second side 364. The lever 366 is depicted in FIG. 3B in a resting position. FIG. 3C depicts the apparatus 350 with the lever 366 in a peeling position. When a user applies a tilt force $F_{tilt}$ to the lever 366, the lever 366 applies a peeling force $F_{peel}$ to the interface material 380 to initiate a peel to de-bond the apparatus 350 from the display 10.

Figure 4:
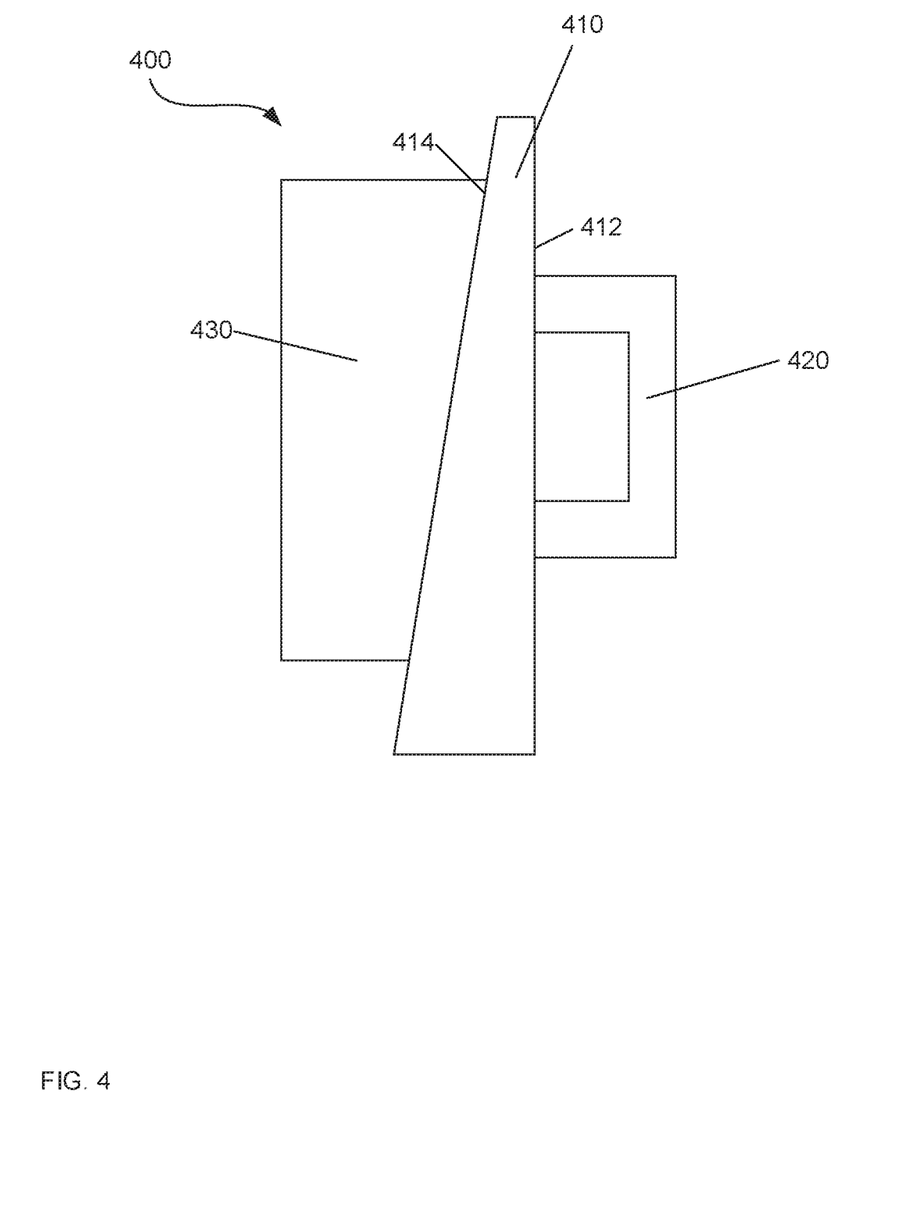
FIG. 4 depicts a side view of an apparatus for removing a display from a tiled display arrangement, according to yet a further embodiment of the invention.

FIG. 4 depicts another embodiment of an apparatus 400 for removing a display, such as the display 10, from a tiled display arrangement. The apparatus 400 has a body 410 having a first side 412 and a second side 414; a handle 420 coupled to the first side 412 of the body 410; and an interface material 430 (similar to the interface material 130) coupled to the second side 414 of the body 410. At the apparatus 400 an interface material 430 has a varying thickness across the second side 414 of the body 410. The body 410 may also have a varying thickness to complement the varying thickness of the interface material 430.

Figure 5:
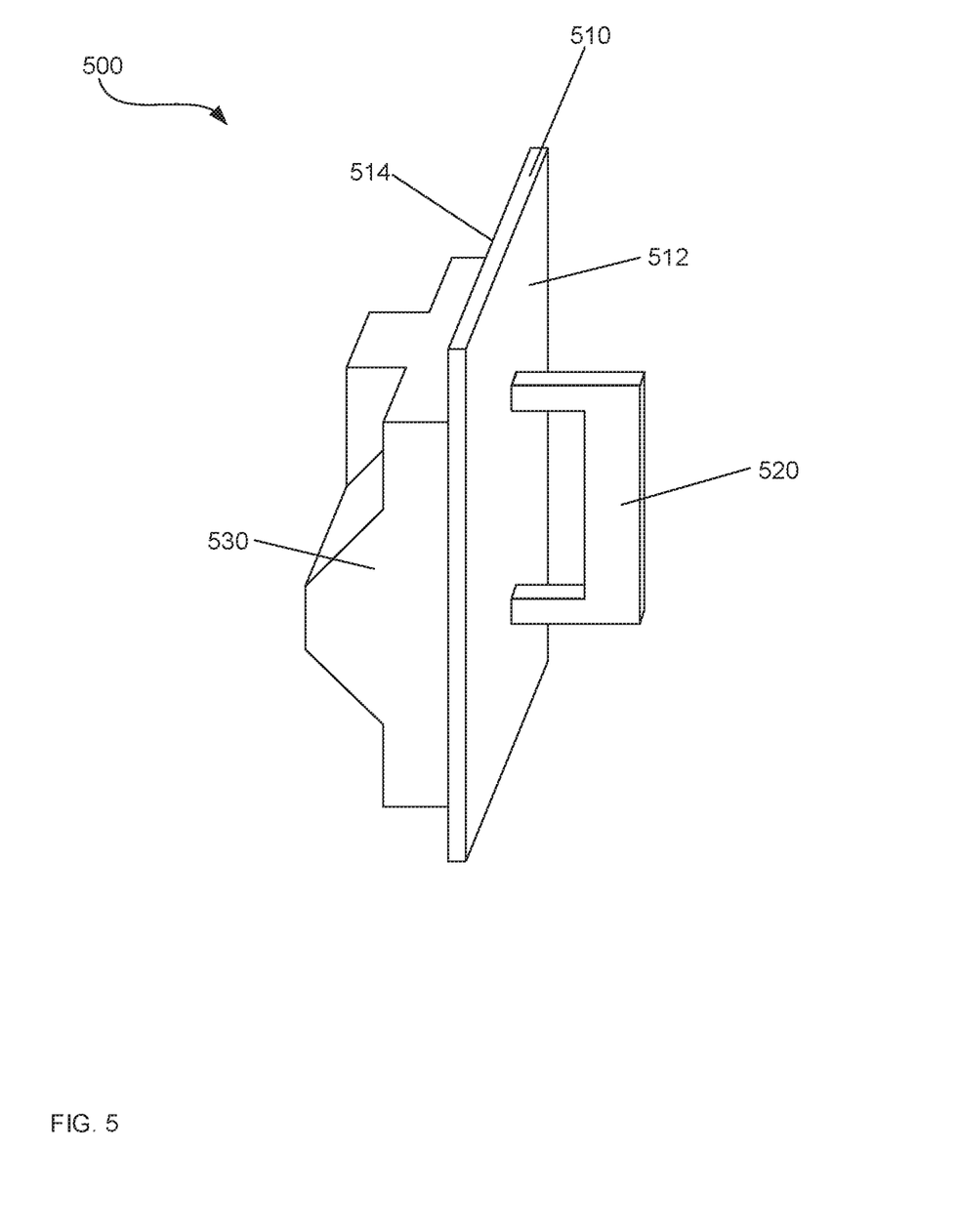
FIG. 5 depicts a perspective view of an apparatus for removing a display from a tiled display arrangement, according to a further embodiment of the invention.

FIG. 5 depicts another embodiment of an apparatus 500 for removing a display from a tiled display arrangement. The apparatus 500 has a body 510 having a first side 512 and a second side 514; a handle 520 coupled to the first side 512 of the body 510; and an interface material 530 coupled to the second side 514 of the body 510. The apparatus 500 illustrates a multifaceted interface material 530 for adhering to uneven surfaces. The interface material 530 may be configured to adhere to a display with uneven surfaces by being multifaceted so that the surface of the interface material 530 complements the uneven surface of the display. Hence the interface material adheres to each deformation in the uneven surface for maneuvering the apparatus 500 and the display. Alternately, interface material 530 may be configured to be multifaceted to restrict the contact areas of the apparatus 500 and the display according to desired contact areas. For instance, if there are sensitive areas which should not contact the interface material 530, interface material 530 may be contoured and/or faceted to avoid these areas and only adhere to the display surrounding the sensitive areas.

Figure 6:
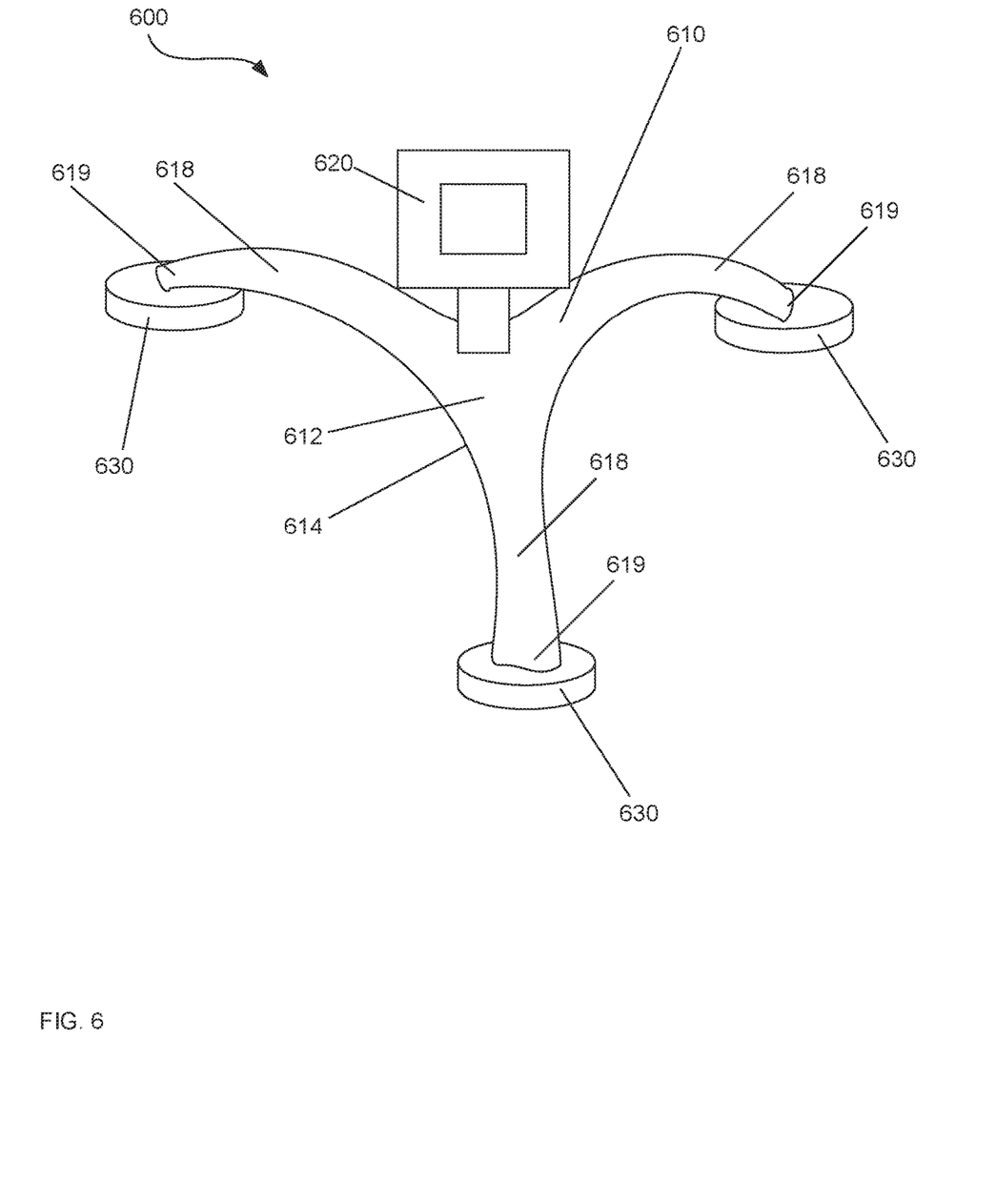
FIG. 6 depicts a perspective view of an apparatus for removing a display from a tiled display arrangement, according to a further embodiment of the invention.

FIG. 6 depicts another embodiment of an apparatus 600 for removing a display from a tiled display arrangement. The apparatus 600 has a body 610; a handle 620 coupled to the body 610; legs 618 extending from the body 610, each leg terminating in a foot 619; and an interface material 630 coupled to the legs 618. In some embodiments, the body 610 may have a first side 612 and a second side 614, the handle 620 coupled to the first side 612, and the legs 618 extending from the second side 614. The legs 618 may comprise any suitable material for providing structural support for the interface material 630. The legs 618 may be integral with the body 610 or may be coupled to the body 610 by welds, screws, bolts, or other suitable fasteners. The interface material 630 may be separated into multiple pads of the interface material 630, each pad coupled a foot 619 of a leg 618.

The apparatus 600 has multiple pads of the interface material 630 which may be applied to the front surface of the display. The legs 618 may vary in quantity, length and distance from the body 610 to accommodate an uneven surface, desired contact areas and strength of adhesion. The apparatus 600 may be de-bonded from the display using a multi-pad peel, wherein the pads of the interface material 630 are peeled one at a time by applying a tilting force to the handle.

Figure 7:
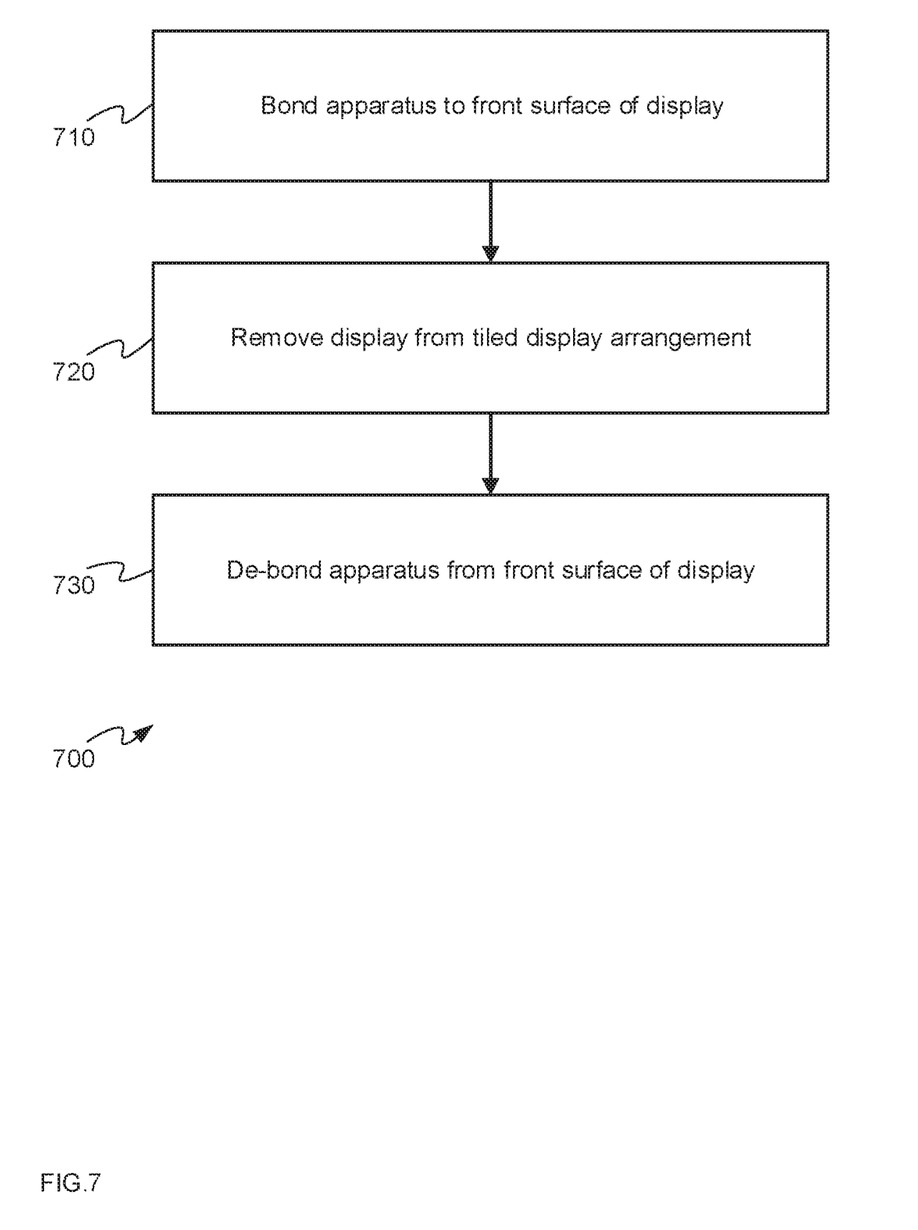
FIG. 7 depicts a method of removing a display from a tiled display arrangement, according to an embodiment of the invention.

FIG. 7 depicts a method 700 of removing a display, such as the display 10, from a tiled display arrangement in accordance with the present invention. The method 700 may be performed using any the apparatuses described above, or by other suitable apparatuses.

At block 710, an apparatus is bonded to a front surface of the display 10 using an interface material of the apparatus, for example, as illustrated in FIG. 8.

At block 720, the display 10 is removed from the tiled display arrangement using the apparatus, for example, as illustrated in FIG. 9.

At block 730, the apparatus is de-bonded from the front surface of the display 10.

In some embodiments, the de-bonding comprises peeling the interface material from the front surface of the display 10, for example, as illustrated in FIGS. 10 and 11.

In some embodiments, the peeling is one of: a pivot peel, a roll peel, a path peel, or a multi-pad peel. In other embodiments, the de-bonding further comprises depressing a plunger, such as plunger 316 as seen in FIG. 3A to initiate the peeling of the interface material from the front surface of the display 10.

Thus, an apparatus and method are provided for removing a display from the tiled display arrangement. The apparatus is lightweight and strong. High tensile strength and high shear strength of the bond of the interface material to the display allow the display to be securely removed from the mounting mechanism of the tiled display arrangement. Further, low peel strength of the interface material allows the apparatus to be easily and selectively de-bonded from the front surface of the display. The thickness and geometry of the interface material and the body may be varied and selected to achieve specific performance desired for adhesion and peel. Thus, the apparatus may be used on displays with uneven surfaces. Further, the since the apparatus adheres to the front surface of the display, it may be used effectively for small-bezel or bezel-less display units.

The invention claimed is:

1. An apparatus for removing a display in a tiled display arrangement, the apparatus comprising:
   a body having a first side and a second side opposing the first side;
   a handle coupled to the first side of the body; and
   an interface material coupled to the second side of the body, the interface material configured to form a bond to a front surface of the display, the bond having a shear strength for removing the display from the tiled display arrangement; and a peeling mechanism of the body, the peeling mechanism to apply a peeling force to the bond to de-bond the apparatus from the front surface of the display, wherein the bond has a peel strength of about 5-10% of the shear strength.

2. The apparatus of claim 1 wherein the interface material comprises an adhesive.

3. The apparatus of claim 2 wherein the adhesive comprises a dry adhesive.

4. The apparatus of claim 1 wherein the interface material comprises a micro- or nano-suction material.

5. The apparatus of claim 1 wherein the peeling mechanism comprises a spring-loaded plunger to apply the peeling force for selectively de-bonding from the front surface of the display.

6. The apparatus of claim 1 wherein the peeling mechanism comprises a lever to apply the peeling force for selectively de-bonding from the front surface of the display.

7. The apparatus of claim 1 wherein the interface material has a varying thickness.

8. The apparatus of claim 1 wherein the body has a varying thickness.

9. The apparatus of claim 1 wherein the interface material is multifaceted for adhering to uneven surfaces.

10. The apparatus of claim 1 further comprising legs extending from the second side of the body and wherein the interface material is coupled to the legs.

* * * * *